United States Patent [19]

Dolinski et al.

[11] 4,259,774

[45] Apr. 7, 1981

[54] HUB INSTALLING AND REMOVING TOOL

[75] Inventors: Stanley R. Dolinski, Dayton; Howard L. DeHart, West Milton, both of Ohio

[73] Assignee: General Motors Corporation, Detroit, Mich.

[21] Appl. No.: 79,120

[22] Filed: Sep. 26, 1979

[51] Int. Cl.$^3$ .............................................. B23P 19/04

[52] U.S. Cl. ...................................................... 29/263

[58] Field of Search ................. 29/256, 258, 263, 264; 81/53.2

[56] References Cited

U.S. PATENT DOCUMENTS

| | | | |
|---|---|---|---|
| 1,608,800 | 11/1926 | Martin | 29/263 |
| 2,391,624 | 12/1945 | Heuer | 81/53.2 |
| 3,110,958 | 11/1963 | McCord | 29/263 |

*Primary Examiner*—Robert C. Watson

*Attorney, Agent, or Firm*—Edward P. Barthel

[57] ABSTRACT

A universal tool for installing and removing hubs on a shaft having a threaded end portion. The assembled tool comprises a support member, a reversible member, a bearing and a plug. The reversible member includes an integral drive and bearing support portion intermediate its ends with an externally threaded removal portion on one end of the reversible member and an installing guide portion on the other end thereof.

2 Claims, 6 Drawing Figures

HUB INSTALLING AND REMOVING TOOL

This invention relates generally to hand tools and more particularly, to such a tool adapted for selectively installing and removing a hub on a shaft.

It is known in the prior art to provide two separate tools for use in disassembling and assembling a driver plate and hub on an air conditioning compressor magnetic clutch. In an automotive air conditioning system some service operations on the compressor can be performed without removing the compressor from the vehicle. Among these operations are the removal and replacement of the clutch drive plate and hub assembly where "on the vehicle" space permits. It will be appreciated that in such service operations the ever decreasing clearance space within the engine compartment has made operations performed "on the vehicle" more of a challenge.

Accordingly, it is an object of the present invention to provide an improved hub installing and removing tool which is of relatively simple, low cost construction and which replaces two separate tools with a single four part easily manipulable tool.

It is another object of the present invention to provide such an improved installing and removal tool comprising a support member, a reversible member, a bearing and a plug which is compact to allow the servicing of an automotive air conditioning compressor clutch to be performed on the vehicle.

Additional objects and advantages of the present invention will become apparent from the following description, reference being had to the accompanying drawings wherein a preferred embodiment of the present invention is clearly shown.

Figure 1:
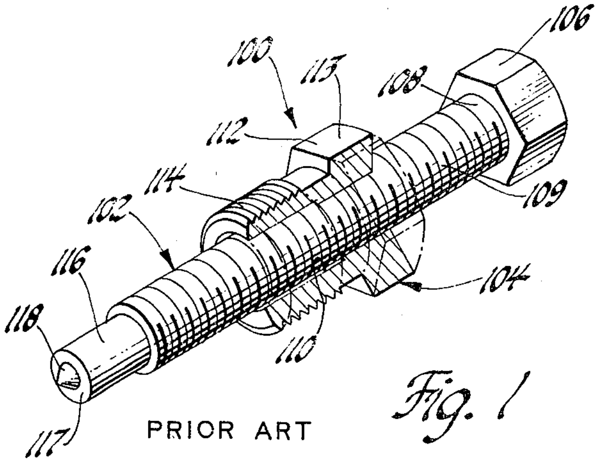
PRIOR ART Fig. 1
FIG. 1 is a perspective view, with portions broken away, showing a prior art hub removal tool.
Figure 2:
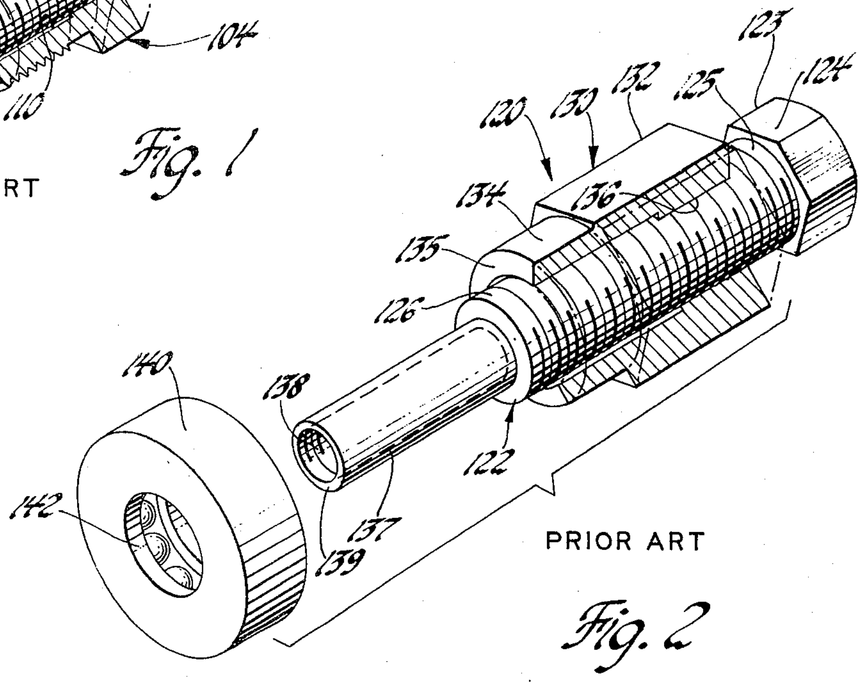
PRIOR ART Fig. 2
FIG. 2 is a perspective view, with parts broken away, showing a prior art hub installation tool.

Before describing the invention in detail, a conventional hub remover and installer will be described. FIG. 1 represents a prior art tool for removing a hub member from a shaft such as the hub portion of a magnetic clutch drive plate and hub asssembly shown in FIG. 3. FIG. 2 represents a prior art tool for installing the hub member. In order to understand the operation of the conventional tools of FIGS. 1 and 2 in a particular application, reference will be made to the magnetic clutch shown in FIG. 3.

A device to be driven, such as a refrigerant compressor 20, is provided with a housing 22 surrounding a valve plate 24 and a plurality of cylinders 26 containing pistons 28 which are operated by a drive shaft 30 rotatably mounted in needle bearings 32. The housing 22 also includes a discharge chamber 34 as well as inlet chambers 36. A front discharge head 38 is secured on the housing by means of mounting ring 39 welded to the housing 22. The drive shaft 30 extends through an integral tubular extension 42 provided on the head 38. A rotating shaft seal 44 located on the shaft 30 within inner bore 45 of the extension 42. The rotating shaft seal 44 is pressed into sealing engagement with a stationary seal ring 46 sealed to the extension 42 by a gasket seal ring 48 lodged in a groove. The seal ring 46 is locked in place by split lock ring 49. The extension inner bore 45 is enlarged for easy removal of the lock ring 49, the seal ring 46 and the rotating part 44 of the shaft seal.

The enlarged inner stepped bore 47 of the tubular extension 42 provides room for the greater portion of a hub, generally indicated at 50, which is mounted upon a reduced end portion 52 of the drive shaft 30 with spacing rings 54 provided between the inner end of the hub 50 and the shoulder 56 on the shaft 30. The hub 50 is keyed to the shaft 30 by a key 58 and is held on the end of the shaft by nut (not shown). Welded or otherwise bonded to the hub 50 is a disc 60 of steel to which is bonded an elastomeric ring 61. The elastomeric ring 61, also bonded to a metal ring 62, is further provided with three apertures 65 to enable the metal ring 62 to be connected by rivets 64 to three double thickness leaf springs 66 extending from the rivets 64 in a direction opposite the direction of rotation. The complete the clutch description the leaf springs 66 are connected at their outer ends by the rivet 68 to an armature plate 70 of paramagnetic material such as low carbon steel. The armature plate 70 is divided into an inner ring 72 and an outer ring 74 connected by integral webs as shown for example in U.S. Pat. No. 3,082,933 issued Mar. 26, 1963. As shown, the leaf springs 66 are flat and exactly perpendicular to the axis of rotation in the unattracted position.

For attracting the armature plate 70 there is provided an annular coil 80 of many turns surrounding the tubular extension 42. The coil 80 is embedded within and surrounded by suitable resin 82 such as epoxy or nylon, which is cast within housing 84. The coil housing 84 includes a horizontal flange portion 86 extending toward the armature plate 70 and a radial portion 88 extending inwardly toward tubular extension 42. A drive pulley 90 has inner and outer rings of paramagnetic material and includes on its outer rim a V-belt pulley groove containing a V-belt 92 providing a driving connection with a pulley (not shown) upon the crankshaft of an automobile engine (not shown).

Returning now to the prior art tool of FIG. 1, there is shown a removal tool 100 comprising a machine bolt 102 and a female holder 104. The bolt 102 includes an enlarged head 106 and a shank 108 provided with helical thread form 109. The screw threaded shank is adapted to screw into threaded bore 110 extending through the holder. The holder includes an enlarged head portion 112, with wrench surfaces 113 thereon, at one end and an externally threaded boss 114 at its opposite end. The shank 108 terminates in a reduced diameter rod portion 116 having its end face 117 provided with a cone-shaped axial protrusion 118.

The prior art installer tool 120, shown in FIG. 2, includes a machine bolt 122 having an enlarged head 123 formed integrally therewith with flat tool engaging faces 124 and a shank 125 provided with conventional helical threads 126. A force transmitting holder 130 comprises an elongated driver portion 132 of hexagonal cross section adjacent the bolt head 123 and a reduced diameter cylindrical portion 134 provided at its inner end terminating in a planar shoulder 135. The elongated holder 130 has an internally threaded axial bore approximately half of which is threaded at 136 through which the shank 125 threads 126 are threaded. The shank 125 has a reduced diameter tubular extension 137 which is cylindrical and has a central internally threaded bore 138 opening through its lower end 139. The bore 138 extends to a point near the junction with the external threads 126 sufficient to give firm threaded engagement with the external threads 53 on the end of the drive shaft 30 when the part are assembled in a manner similar to that shown in FIG. 4.

The prior art installer tool 120 of FIG. 2 includes, as a final element, a bearing member 140 having a central axial opening 142 through which the tubular portion 137 is inserted such that a surface of bearing 140 contacts the end shoulder 135 of the holder.

Figure 3:
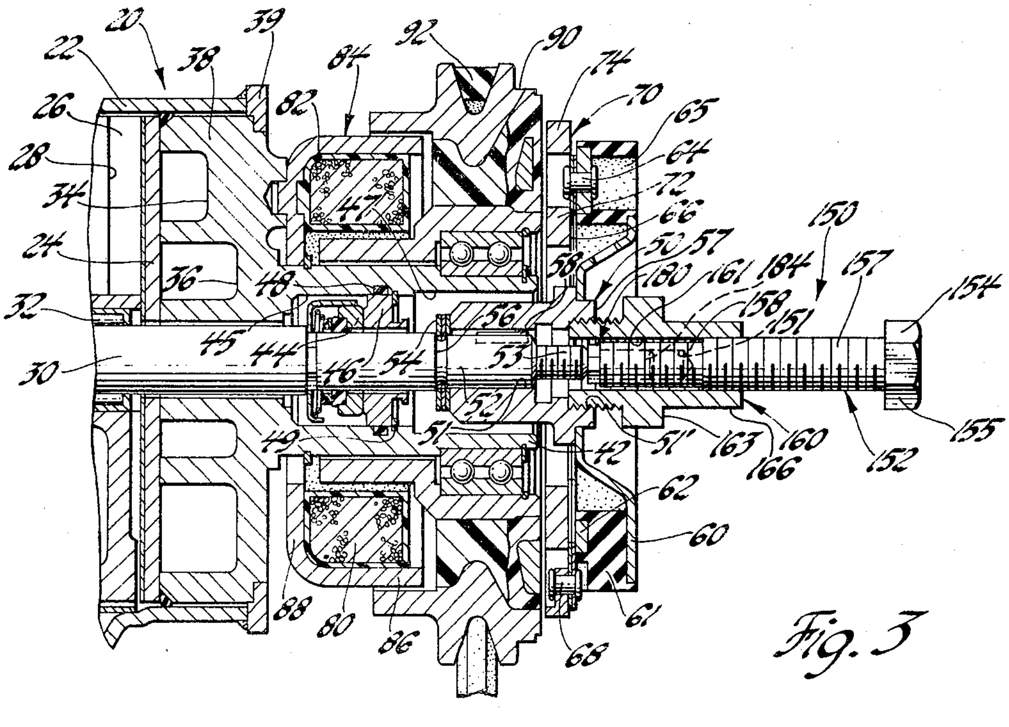
FIG. 3 is a sectional view through an electromagnetic clutch and adjacent end portion of an air conditioning compressor showing the tool of the present invention in its removing mode of operation.
Figure 4:
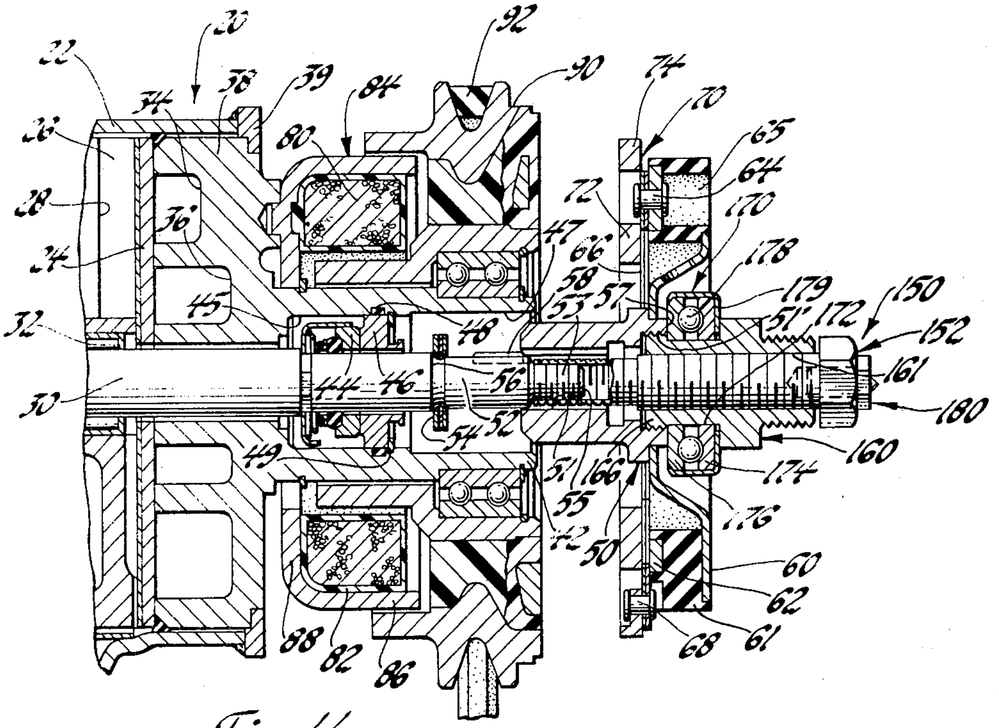
FIG. 4 is a view similar to FIG. 3 disclosing the tool of the present invention in its installing mode of operation.
Figure 5:
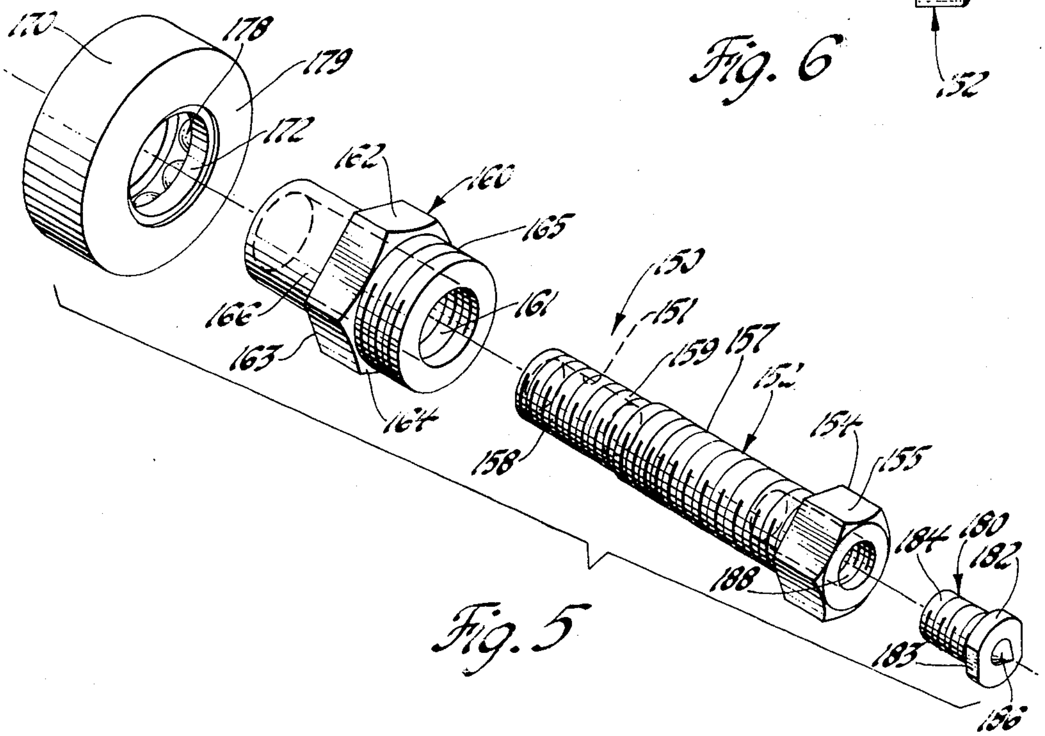
FIG. 5 is a perspective exploded view of the tool of the present invention with the component parts separated prior to assembly thereof for its installing mode.

Turning now to the present invention a hub removing and installing tool is shown generally at 150 in FIG. 5. The tool 150 itself comprises a central support member or machine bolt 152 having on one end thereof a head 154 formed integrally therewith and having driving surfaces formed thereon in the form of flat lateral tool engaging faces 155. It will be noted in FIG. 6 that the tool support member 152 has an uninterrupted helical threaded shank including a first crested helical thread portion 157 extending from the head 155 to a defined location intermediate the head and the free end 158 of the shank. The shank thread further having a truncated helical thread portion 159 extending from the predetermined intermediate location to the shank free end with the truncated helical thread portion 159 having a predetermined diameter sufficiently small for telescopic interference-free insertion into both the inner bore 51 and outer counterbored portion 51' of the hub 50. The shank free end 158 has an internal screw thread 151 which fits the external screw thread 53 on the end of the drive shaft portion 52. The tool 150 further includes a generally cylindrical reversible member 160 provided with a threaded axial bore 161 extending therethrough which fits both the crested and the truncated 159 helical threaded portions of support member 152. The reversible member 160 further includes an integral drive and bearing support portion 164 intermediate its ends having flat tool engaging faces 162 and oppositely facing shoulders 163 and 164. The reversible member 160 further includes an externally threaded removal portion 165 on one end thereof and installing cylindrical guide portion 166 on the other end thereof. It will be noted from FIGS. 3 and 4 that the guide portion 166 has a predetermined outer diameter less than the threaded removal portion 165 and a predetermined axial dimension.

Figure 6:
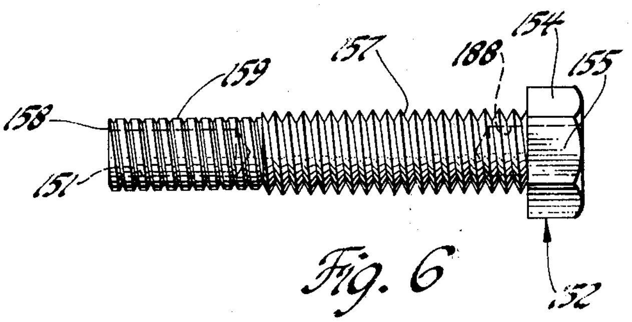
FIG. 6 is an elevational view of the support member of FIG. 5.

As seen in FIGS. 4–6, the installer and removal tool 150 further includes a ring-like spacer bearing 170 having a central aperture 172. The spacer bearing and preferred embodiment comprises a pair of disc-shaped races 174 and 176 with a plurality of ball bearings 178 positioned in the opposed races with the bearing having a suitable outer metal shall or housing 179 enclosing the bearing races. As seen in FIG. 4, the reversible member's installing guide portion 166 is of a size such that it telescopes within the aperture 172 of the bearing 170 allowing the bearing one end face to seat against the stop shoulder 163. Further, the guide portion has sufficient length to extend axially beyond the spacer bearing so as to be adapted for seating between the stop shoulder 163 and the outer edge 57 of the hub 50 allowing the guide portion to be closely telescopically received within the central opening 172 for insertion into the hub bore portion 51. As seen in FIG. 5, the last element of the tool 150 is a plug, generally indicated at 180, including a cap 182 on one end provided with flat edge surfaces 183 and a reduced diameter threaded shank 184. The plug cap 182 includes a cone-shaped locator 186. When the tool 150 is used in its removing mode of FIG. 3 the plug's threaded shank 184 is threadably inserted in internally threaded blind bore 151 of support member 152, whereby the locator 186 on the plug provides a thrust contact with the end 55 of the outer shaft portion 53.

In operation to remove the clutch plate and hub assembly as shown in FIG. 3 the compressor 20 is first attached to a suitable holding fixture (not shown) which fixture is in turn fixed as by clamping in a vise. Next keeping the clutch hub 50 from turning with a suitable clutch hub holding tool a shaft nut (not shown) is removed from the shaft external screw thread 53 using a thin wall socket.

The third step involves threading the reversible member 160 onto the internal threads 51' of hub 50. Holding the engaging faces 162 of member 160 with a wrench the center screw or support member 152 is turned into member 160, with the cone-shaped locator 186 engaging the free end of portion 53, resulting in the removal of the clutch plate and hub assembly.

To replace the clutch plate and hub assembly the shaft key 58 is installed into the hub key groove. With the shaft key aligned the clutch plate and hub assembly is assembled on the compressor shaft as shown in FIG. 4. With the reversible member 160 in its reversed position on the support member's threaded shank the guide portion 166 is through the central aperture 172 of the spacer bearing 170 so as to contact the stop shoulder 163. It will be noted that in FIG. 4 the plug 180 has been removed from its blind bore 151 and threaded into blind bore 188 in the support member 152. The next step is to hold the hex portion 162 of member 160 with a wrench and tighten the center screw or support member 152 to press the hub onto the shaft until there is a predetermined air gap between the frictional surfaces of the clutch or armature plate 70 and the clutch rotor 90 determined by a suitable spacer bearing. The penultimate step involves installing a new shaft nut using a special thin wall socket. The final step is to hold the clutch plate and hub assembly with a special clutch hub holding tool and tighten to the required torque.

While the embodiment of the present invention as herein disclosed constitutes a preferred form, it is to be understood that other forms might be adopted.

The embodiments of the invention in which an exclusive property or privilege is claimed are defined as follows:

1. A universal tool adapted for installing and removing modes of operation for selectively installing and removing a hub on a shaft in which the hub has an inner bore portion for receiving an inner shaft portion and an outer counterbored portion for receiving an outer shaft portion and in which the outer shaft portion and outer counterbore portion are threaded, said tool comprising a support member, a reversible member, a bearing and a plug; said support member including a head having driving surfaces formed thereon and an uninterrupted helical threaded shank, said shank thread including a crested helical thread portion extending from said head to a predetermined location intermediate said head and the free end of said shank, said shank thread having a truncated helical thread portion extending from said predetermined intermediate location to said shank free end and having a predetermined diameter sufficiently small for telescopic interference-free insertion into both bore portions of said hub, said support member's shank having an axial threaded blind bore in the free end thereof, said reversible member provided with a threaded axial bore extending therethrough, said reversible member including an integral drive and bearing support portion intermediate its ends, said reversible member having an externally threaded removal portion on one end thereof and an installing guide portion on the other end thereof, said bearing adapted, when said tool is used in its installing mode of operation to be carried on the guide portion of said reversible member against the bearing support portion thereof in a manner allowing said guide portion to be telescopically received sufficiently within the bore portion of the hub to align the support portion of the tool for threaded engagement by said shank's blind bore with the threaded portion of the shaft, said externally threaded removal portion adapted, when said tool is used in its removing mode of operation, with said reversible member reversed end-for-end on said support member, for threaded engagement by said externally threaded removal portion with the counterbore portion of said hub; said plug including a locator on one end and threads on the other end adapted, when said tool is used in its removing mode, to be threadably inserted in said shank blind bore, whereby the locator on said plug provides a thrust bearing contact with the end of the outer shaft portion such that upon said support member being driven in a predetermined direction said tool operates to remove the hub from the shaft.

2. A universal tool adapted for installing and removing modes of operation for selectively installing and removing a clutch plate and hub assembly on a compressor shaft, the hub including an inner bore portion for receiving an inner shaft portion and an outer counterbored for receiving an outer shaft portion and in which the outer shaft portion and outer counterbore portion are threaded, said tool comprising a support member, a reversible member, a bearing and a threaded plug having a cap on one end with the cap provided with driving surfaces and a locator, said support member including a head having flat driving surfaces formed thereon and an uninterrupted helical threaded shank, said shank thread including a crested helical thread portion extending from said head to a predetermined location intermediate said head and the free end of said shank, said shank thread having a truncated helical thread portion extending from said predetermined intermediate location to said shank free end and having a predetermined diameter sufficiently small for telescopic interference-free insertion into both bore portions of said hub, said support member's shank having an axial threaded blind bore in the free end thereof and said support member's head having an axial threaded blind bore therein, said plug adapted, when said tool is used in its installing mode of operation, for threaded insertion in said head blind bore, said reversible member provided with an axial bore extending therethrough, said reversible member including an integral drive and bearing support portion intermediate its ends, said reversible member having an externally threaded removal portion on one end thereof and an installing guide portion on the other end thereof, said bearing adapted, when said tool is used in its installing mode of operation to be carried on the guide portion of said reversible member against the bearing support portion thereof in a manner allowing said guide portion to be telescopically received sufficiently within the bore portion of the hub to align the support portion of the tool for threaded engagement by said shank's blind bore with the threaded portion of the shaft, said externally threaded removal portion adapted, when said tool is used in its removing mode of operation, with said reversible member threadably removed from said support member shank, reversed end-for-end and threadably replaced on the shank of said support member, for threaded engagement by said externally threaded removal portion with the counterbore portion of said hub; said plug adapted, when said tool is used in its removing mode, to be threadably removed from said head blind bore and threadably inserted in said shank blind bore, whereby the locator on said plug cap provides a thrust bearing contact with the end of the outer shaft portion such that upon said support member being driven in a predetermined direction said tool operates to remove the hub from the shaft.

* * * * *